United States Patent [19]

Chowdhury et al.

[11] Patent Number: 4,461,743

[45] Date of Patent: Jul. 24, 1984

[54] OXYGEN INJECTION NOZZLE FOR WET OXIDATION REACTORS

[75] Inventors: Ajit K. Chowdhury, Schofield; Gerald L. Bauer, Rothschild; Richard W. Lehmann, Rib Mountain, all of Wis.

[73] Assignee: Sterling Drug Inc., New York, N.Y.

[21] Appl. No.: 346,646

[22] Filed: Feb. 8, 1982

[51] Int. Cl.³ .............................................. B01F 1/14
[52] U.S. Cl. .................... 422/129; 137/592; 138/114; 138/148; 138/149; 422/198; 422/224
[58] Field of Search ............ 422/129, 224, 198; 137/592; 138/148, 149, 113, 114, 111, 104

[56] References Cited

U.S. PATENT DOCUMENTS

| | | | |
|---|---|---|---|
| 903,878 | 11/1908 | Mock | 138/148 X |
| 1,844,653 | 2/1932 | Hechenbleikner | 422/224 X |
| 2,071,721 | 2/1937 | Bagley et al. | 422/198 X |
| 2,701,756 | 2/1955 | Eastman et al. | 138/149 X |
| 2,937,662 | 5/1960 | Green | 138/149 X |
| 3,502,445 | 3/1970 | Ballard et al. | 422/224 X |
| 4,323,088 | 4/1982 | McClellan | 138/149 X |
| 4,346,060 | 8/1982 | Eagle et al. | 422/198 |
| 4,370,304 | 6/1983 | Hendricks et al. | 422/224 |

FOREIGN PATENT DOCUMENTS 1138741  7/1961  Fed. Rep. of Germany.

*Primary Examiner*—Robert L. Lindsay, Jr.
*Attorney, Agent, or Firm*—Allen H. Erickson; Thomas L. Johnson; B. Woodrow Wyatt

[57] ABSTRACT

An apparatus for injecting a mixture of pure oxygen or oxygen-enriched air (at least 25 percent oxygen) and purge water into a wet oxidation reactor operating at elevated temperature and pressure. An annular space between the oxygen carrying pipe and a second, larger pipe is filled with heat transfer resisting material, either maintained static or passed through the annular space to remove heat therefrom. The temperature of the oxygen and purge water is maintained at less than 250° F., preferably less than 150° F. to minimize evaporation of the purge water. Thus, backflow of organic matter into the oxygen pipe is prevented; plugging of the oxygen pipe by salts is also prevented.

5 Claims, 8 Drawing Figures

OXYGEN INJECTION NOZZLE FOR WET OXIDATION REACTORS

BACKGROUND OF THE INVENTION

1. Field of The Invention

The present invention relates to an apparatus for introducing a stream containing a high oxygen concentration into a wet oxidation reactor used for oxidizing combustible materials in liquid water.

2. Description of the Prior Art

In wet oxidation systems using pure oxygen or oxygen concentrations in excess of 25 percent, safe introduction of the oxygen into the wet oxidation reactor is of utmost importance. The design of the oxygen inlet pipe is critical because the oxygen partial pressure is highest in the inlet pipe, as compared to the partial pressure in any other location in the reactor. Introduction of water (hereinafter called "purge water") together with the oxygen is suggested in order to maintain a continuous positive flow in the oxygen line at all times. Backflow of combustibles from the wet oxidation reactor into the oxygen line is thus prevented. Another important function of the purge line is to provide a heat sink for any hot spots which may be generated due to oxidation of combustibles within or at the end of the oxygen line.

The stream of oxygen and purge water is usually introduced at the bottom of the wet oxidation reactor through a pipe which extends from the wall of the reactor to a point of discharge so as to facilitate good gas dispersion in the reactor. When the wet oxidation reactor is a vertical bubble column, the point of oxygen discharge inside the reactor is preferably near the centerline of the reactor vessel. The temperature of the gas-liquid mixture surrounding the end of the oxygen injection nozzle is often very nearly that of the maximum reactor temperature.

The operating temperature of the wet oxidation system may vary from 300°-650° F., depending upon the particular objective of the process. When operating at high temperatures, for example 620° F., the oxygen pipe inside the reactor, from the reactor wall to the point of discharge, may be heated sufficiently to produce a significant temperature rise in the stream of oxygen and purge water. Some or all of the purge water may evaporate if its temperature is sufficiently increased.

The rate of purge water addition to the stream of oxygen or oxygen-enriched air can vary for 0.01 to 10 pounds water per pound of oxygen, depending upon the process. Since purge water directly contacts the oxygen at elevated pressure, i.e., 300-3500 psig, the water must be free of contaminants which will oxidize or form scale on the pipe surfaces. Potable, deionized, or distilled water may be suitable as purge water. Use of deionized or distilled water will incur substantial additional costs. Use of a high rate of purge water is generally undesirable because dilution of the wet oxidation fuel results in energy losses, analogous to adding water to the fuel which is combusted in a boiler. Use of potable water at the lowest purge water rate is most desirable to produce a cost effective system.

In a wet oxidation system operating at high temperatures, i.e., 620° F., and a low purge water rate of 0.1 pound water per pound oxygen, the heat transfer from the reactor contents into the stream of purge water and oxygen or oxygen-enriched air may be sufficient to cause a significant temperature rise in the stream before it discharges into the reactor. This temperature rise may result in:

(a) elimination of positive liquid water flow in the oxygen nozzle pipe caused by nearly complete evaporation of purge water in the nozzle pipe, and (b) scaling and deposition of salts in the oxygen nozzle pipe, with its eventual plugging.

Increasing the reactor pressure to reduce evaporation requires a more expensive thicker-walled reactor, and in many cases is precluded by the system objectives.

The present invention discloses a design for an oxygen inlet nozzle for a wet oxidation system which eliminates the above problems and enables the use of potable water at low flow rates as purge water for safe introduction of pure oxygen or oxygen-enriched air into the wet oxidation reactor.

SUMMARY OF THE INVENTION

The present invention is an oxygen injection nozzle in a wet oxidation reactor, for injecting a mixture of purge water and pure oxygen or oxygen-enriched air into the reactor. In this invention, transfer of heat from the contents of the reactor to the oxygen and purge water flowing through the oxygen nozzle pipe is substantially minimized so that the purge water discharges into the reactor substantially as liquid water. This invention is a nozzle pipe surrounded by a thermal insulating barrier. This invention is applicable to wet oxidation systems using oxygen or oxygen-enriched air having oxygen content above 25 percent by volume. In this discussion, the word "oxygen" will denote air-oxygen mixtures containing from 25 percent oxygen up to and including pure oxygen.

The thermal insulating barrier is a second pipe annularly separated from the oxygen nozzle pipe to form an intermediate annular space filled with heat transfer resisting material. This apparatus allows the purge water to pass, together with oxygen, into the reactor substantially in the liquid state, thereby preventing backflow of combustibles into the oxygen line and plugging of the oxygen line by precipitated salts.

The oxygen injection nozzle is located at or near the bottom of wet oxidation reactors to provide an optimal usage rate and degree of oxygen transfer.

DESCRIPTION OF THE PREFERRED EMBODIMENTS

Figure 1:
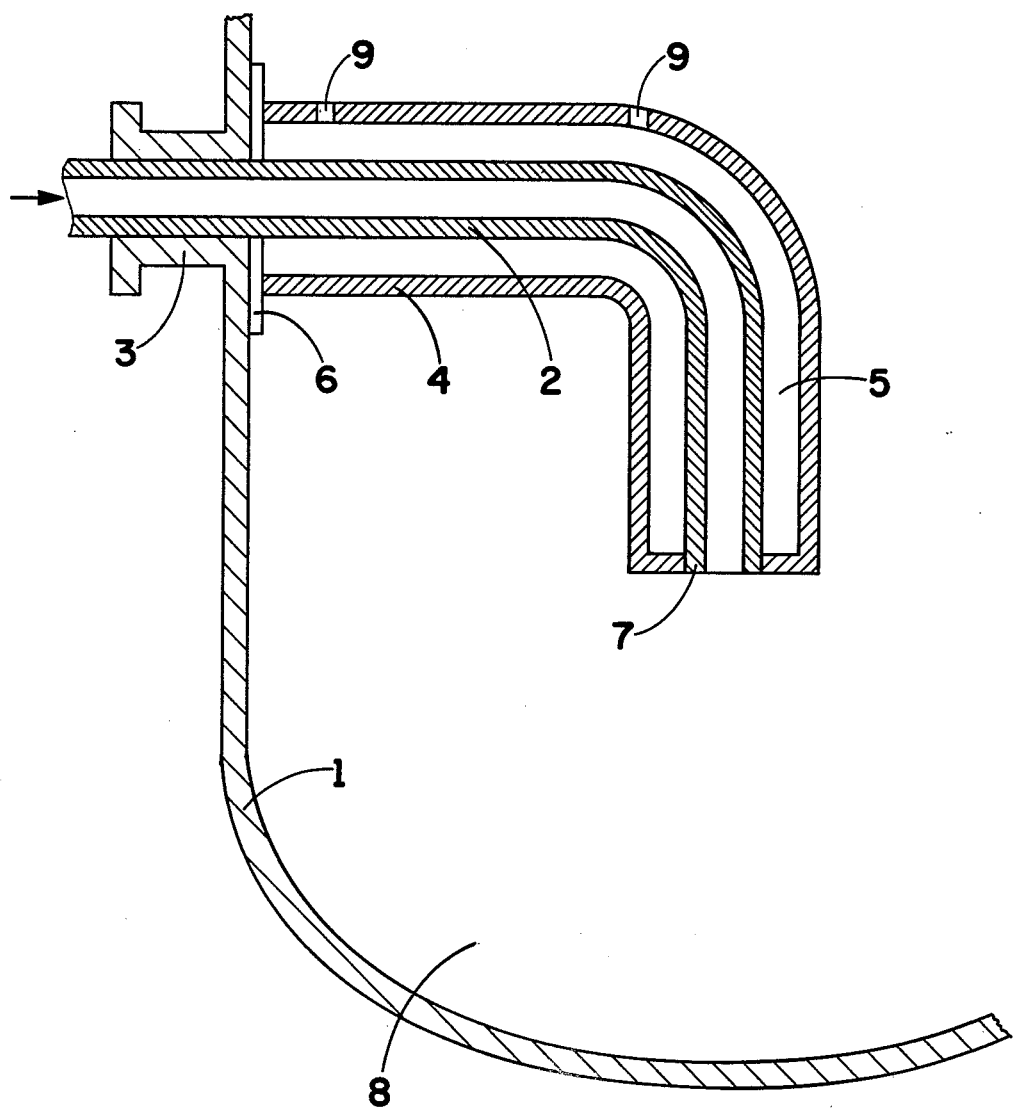
FIG. 1 is a sectional view of one embodiment of the present invention.

The heat transfer barrier between the reactor contents and the oxygen carrying pipe is provided by a jacket annularly spaced from the outside of the oxygen pipe creating an annular space which is filled with a material resistant to heat transfer. The oxygen nozzle pipe and second (outer) pipe are positioned to result in an annular distance of 0.1 to 3 inches between the pipes.

The invention can best be described by reference to the preferred embodiments illustrated in the drawings of FIGS. 1 through 8. It will be understood that the scope of the invention is not limited to the specific embodiments depicted, and that the scope of the invention includes alternatives, modifications and equivalents of the depicted embodiments which are within the scope of the amended claims and which are readily apparent to those skilled in the art.

Referring now to FIG. 1, a portion of the bottom of a wet oxidation reactor 1 together with an oxygen injection nozzle are shown in section. The nozzle introduces a mixture of pure oxygen or oxygen-enriched air, and purge water through oxygen nozzle pipe 2 into the interior 8 of the reactor. The reactor interior 8 is filled with an aqueous solution or slurry of combustible material, together with reaction gases and water vapor.

While FIG. 1 shows pipe 2 as passing through a flange connection 3 into the reactor, any well-known sealing connection may be utilized.

A second larger pipe 4 annularly separated from oxygen nozzle pipe 2 creates a thermal insulation barrier in the thus-formed annular space 5.

The oxygen pipe 2 and second pipe 4, which acts as a jacket, are sealingly joined at the discharge end of pipe 2. The other end of the jacket may be sealingly joined to reactor wall 1 or to a plate 6, or joined to pipe 2. Thus the annular space 5 may be completely sealed to prevent interchange with the reactor contents or any space outside of the reactor. Annular space 5 may be filled with a gas, a gas-liquid mixture, a solid such as calcium silicate, each of which acts as a thermal insulator; or the space may be evacuated.

Preferably however, liquid from the reactor contents is permitted to flow freely into the annular space 5 and fill it to act as a heat transfer resisting material. Water of course has a high heat capacity. In this optional embodiment, one or more connective opening 9 is placed in the upper portion only of the annular space 5 to allow free interchange of liquid while preventing oxygen from accumulating in the intermediate annular space 5. Such accumulation may result in heat-generating oxidation within space 5, an undesirable situation.

Optionally, the joint between pipe 4 and reactor wall 1 or plate 6 may be loosely welded, leaving space for interchange of liquid between the reactor interior 8 and the annular space 5.

When annular space 5 is open to the reactor interior, there will be little or no pressure drop across pipe 4; hence thin-walled pipe may be used as an economy measure.

In FIG. 1, the injection nozzle includes a 90 degree angular pipe with discharge downward. Alternately, the angled pipe may be directed upward. In this case, opening between reactor interior and annular space 5 is preferably located at the discharge end 7 of the nozzle. Preferably, pipe 2 and pipe 4 are not joined at the discharge end.

In a further modification of the apparatus shown in FIG. 1, a barrier to free convective flow of the heat transfer resisting material in annular space 5 is incorporated within the annular space. Such a barrier, comprising glass wool or mineral wool or baffles, reduces the rate of heat transfer to the oxygen-purge water mixture. Any barrier used must be non-reactive under wet oxidation conditions.

Figures 2, 3:
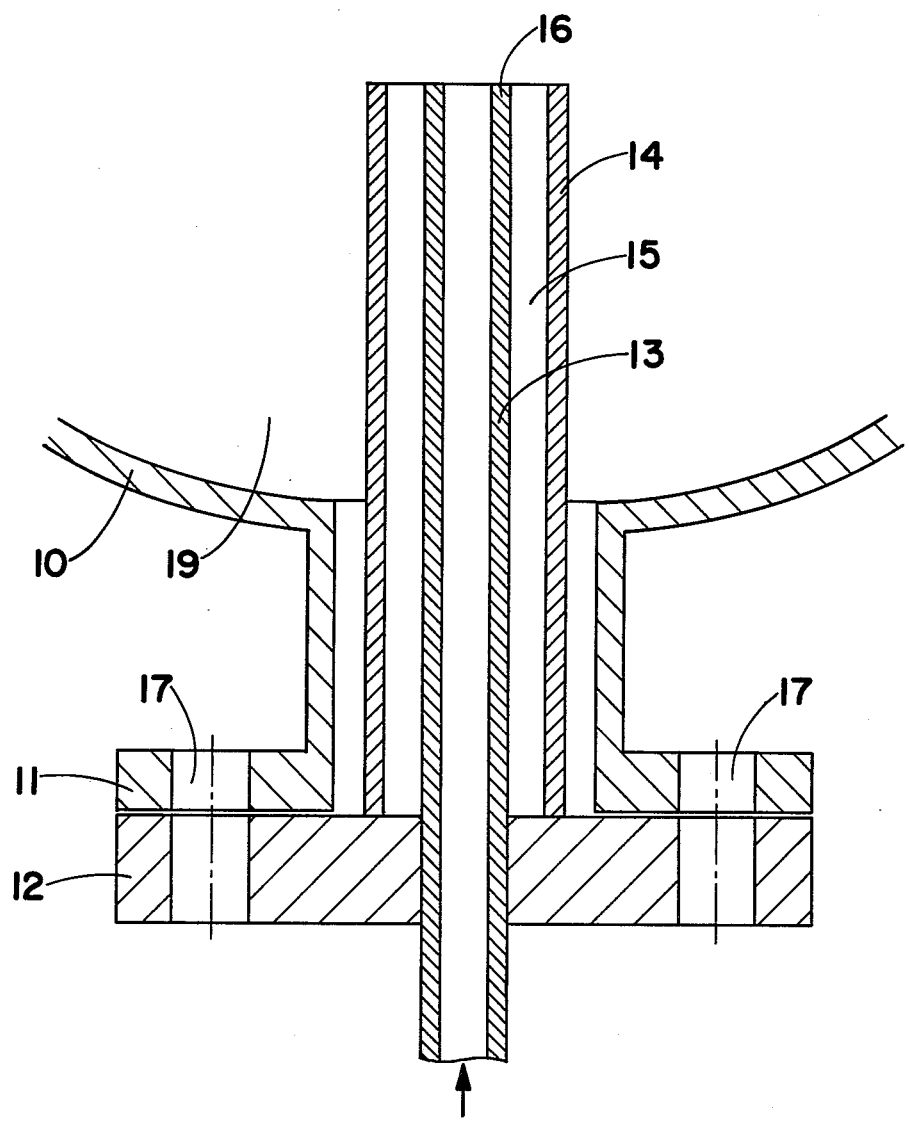
FIG. 2 is a sectional view of another embodiment.
FIG. 3 is a top view of the embodiment shown in FIG. 2.

Turning now to FIG. 2, an oxygen injection nozzle in the bottom 10 of a wet oxidation reactor is shown in section. A mixture of purge water and pure oxygen or oxygen-enriched air is discharged essentially vertically upward within the reactor. This embodiment includes oxygen nozzle pipe 13 having discharge end 16; second pipe 14, and intermediate annular space 15 which is open to the reactor interior 19 at its upper end. Annular space 15 is filled with wet oxidation process liquid. Optionally, a barrier to convective flow such as glass wool or mineral wool, or baffles may be added.

As shown in FIG. 3, oxygen pipe 13 and second pipe 14 may be connected by two or more spacers 18 at the tip 16 to maintain a uniform annular space surrounding oxygen pipe 13.

The embodiment of FIG. 2 is shown attached to the reactor bottom by flanges 11 and 12 with bolt holes 17.

Figure 4:
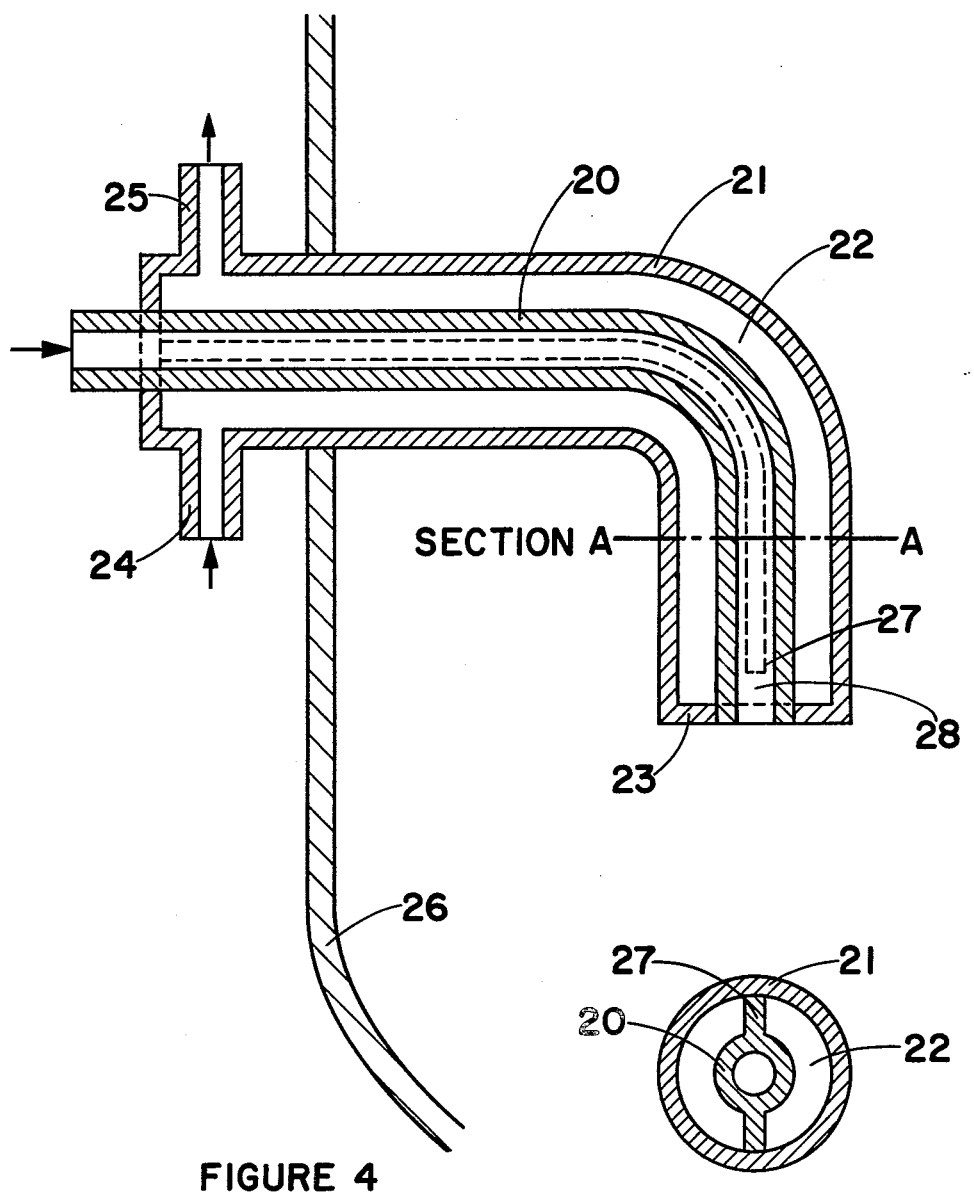
FIG. 4 is a sectional view of a further embodiment.

Another side-entering oxygen injection nozzle is illustrated in section view of FIG. 4. An oxygen nozzle pipe 20 and second pipe 21 are sealingly connected at the discharge end 23 and both pipes pass through reactor wall 26. Annular space 22 is sealed from the reactor interior.

In one form of this nozzle, a compressed fluid, preferably a gas such as air, nitrogen or carbon dioxide is injected into annular space 22 through inlet 24 or 25. The pressure may be maintained to minimize the pressure drop across second pipe 21.

In another form, a fluid, either gas or liquid, is passed through the annular space, being injected and discharged through inlets 24 and 25. Heat is thus removed from oxygen pipe 20 by the heat transfer resisting fluid, which is typically one of nitrogen, carbon dioxide, air, or water. The flow rate may be varied to produce the particularly desired purge water temperature. The annular space 22 is preferably longitudinally divided into an even number of flow areas by two or more spacers 27, the flow areas being connected at opening 28 at the discharge end 23 of the nozzle so that fluid introduced at inlet 24 from outside the reactor passes through the entire length of annular space 22 to remove heat and to discharge from the flow areas through outlet 25 to a point outside the reactor.

Figure 5:
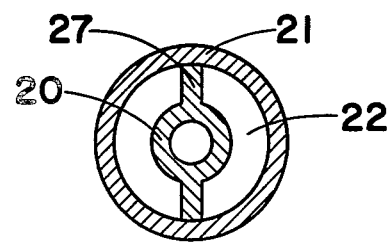
FIG. 5 is a top view through section A—A of FIG. 4.

FIG 5 is a sectional view of the nozzle at A—A of FIG. 4, showing the annular space divided into two flow areas by spacers 27.

Figure 6:
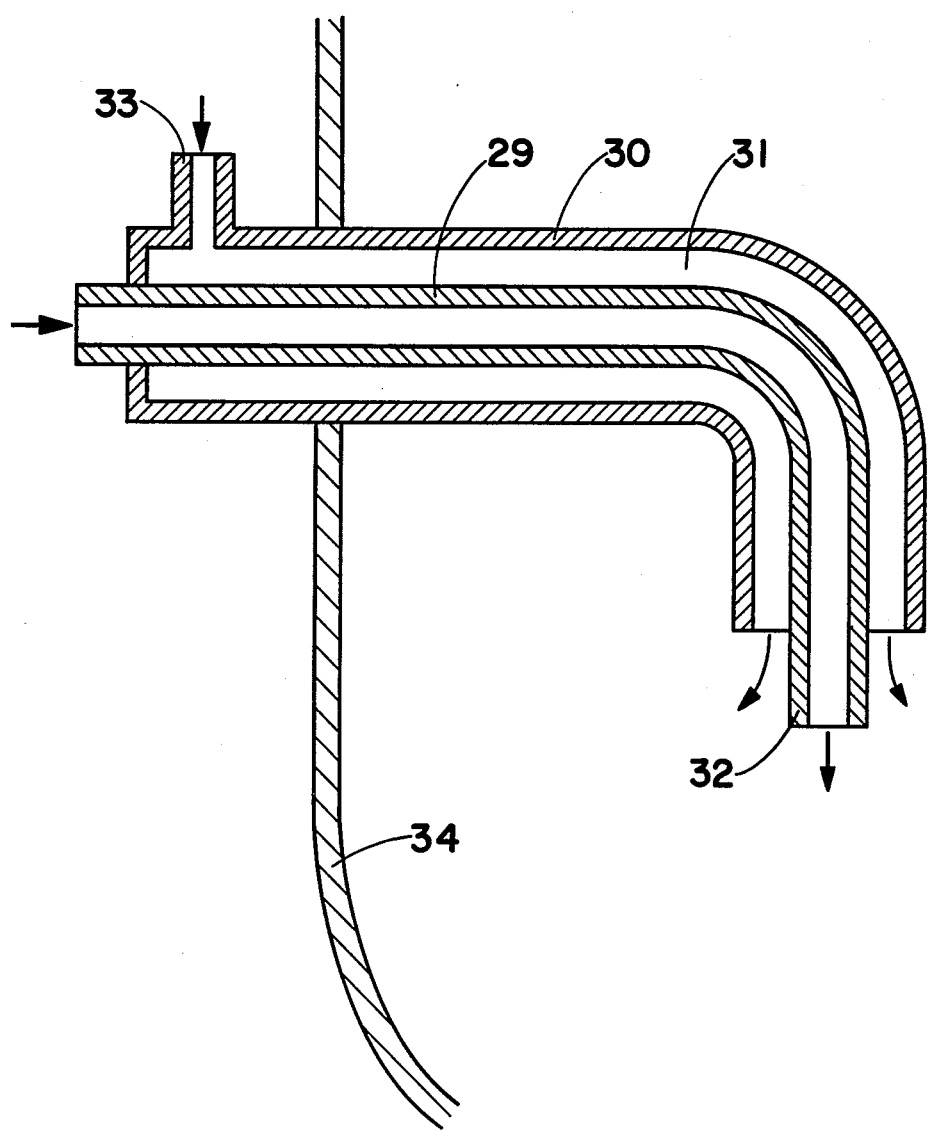
FIGS. 6, 7 and 8 are sectional views of three further embodiments of this invention.

In some cases, it may be desirable to introduce the heat transfer resisting material from the exterior into the reactor itself. One means of accomplishing this method is shown in FIG. 6, where a heat transfer resisting fluid is injected into intermediate annular space 31 at inlet 33, and discharges into the interior of reactor 34 at a point near the discharge end 32 of nozzle pipe 29. The fluid may be either a gas or liquid which cools the nozzle pipe to a safe temperature.

Figure 7:
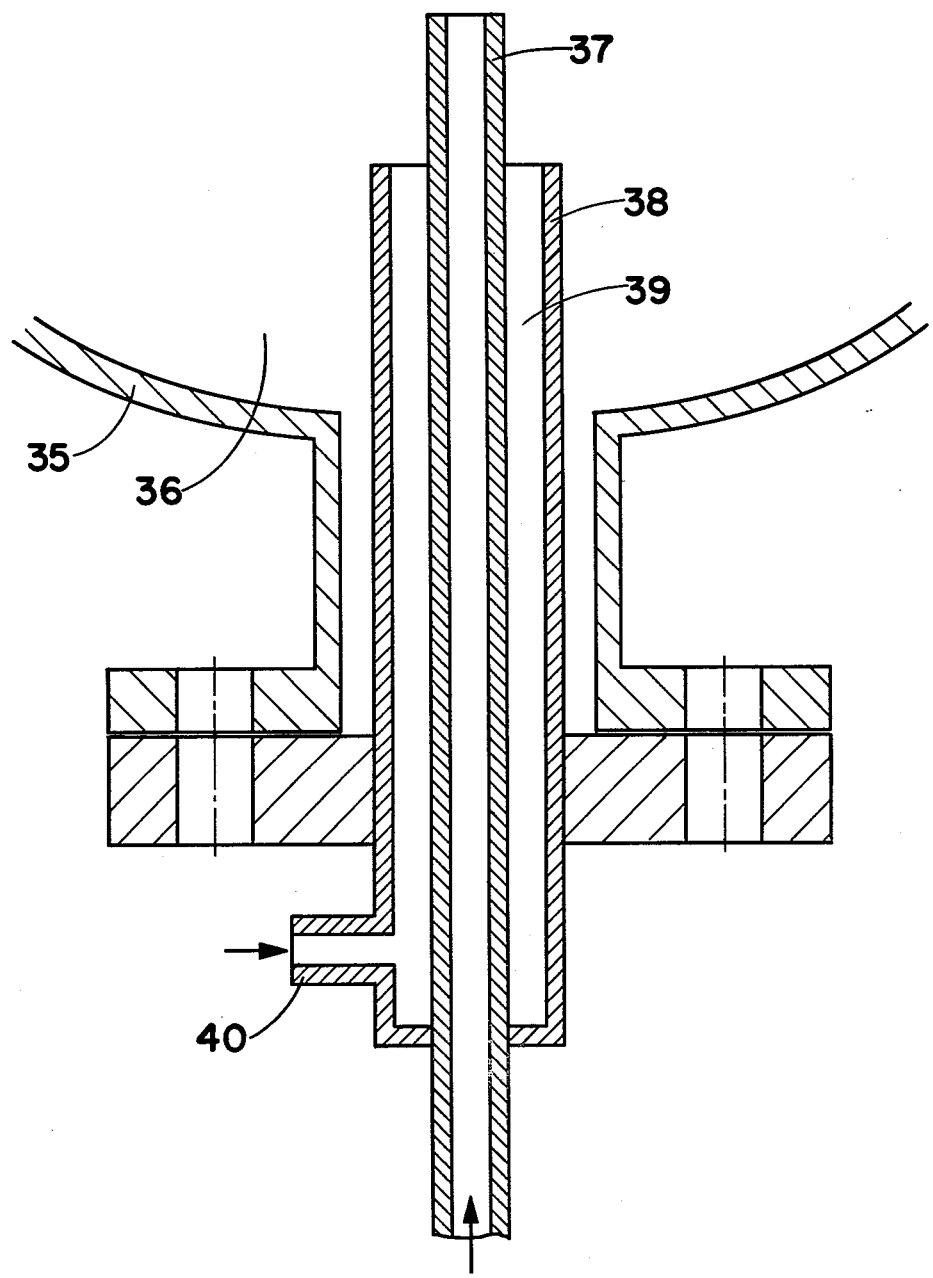

The embodiment shown in FIG. 7 is very similar to that in FIG. 6, except that the apparatus is located at the bottom of reactor 35, rather than at the side wall. Fluid is injected at inlet 40 into annular space 39 between pipe 37 and pipe 38, and flows into reactor interior 36 near the discharge end of the oxygen pipe 37.

Figure 8:
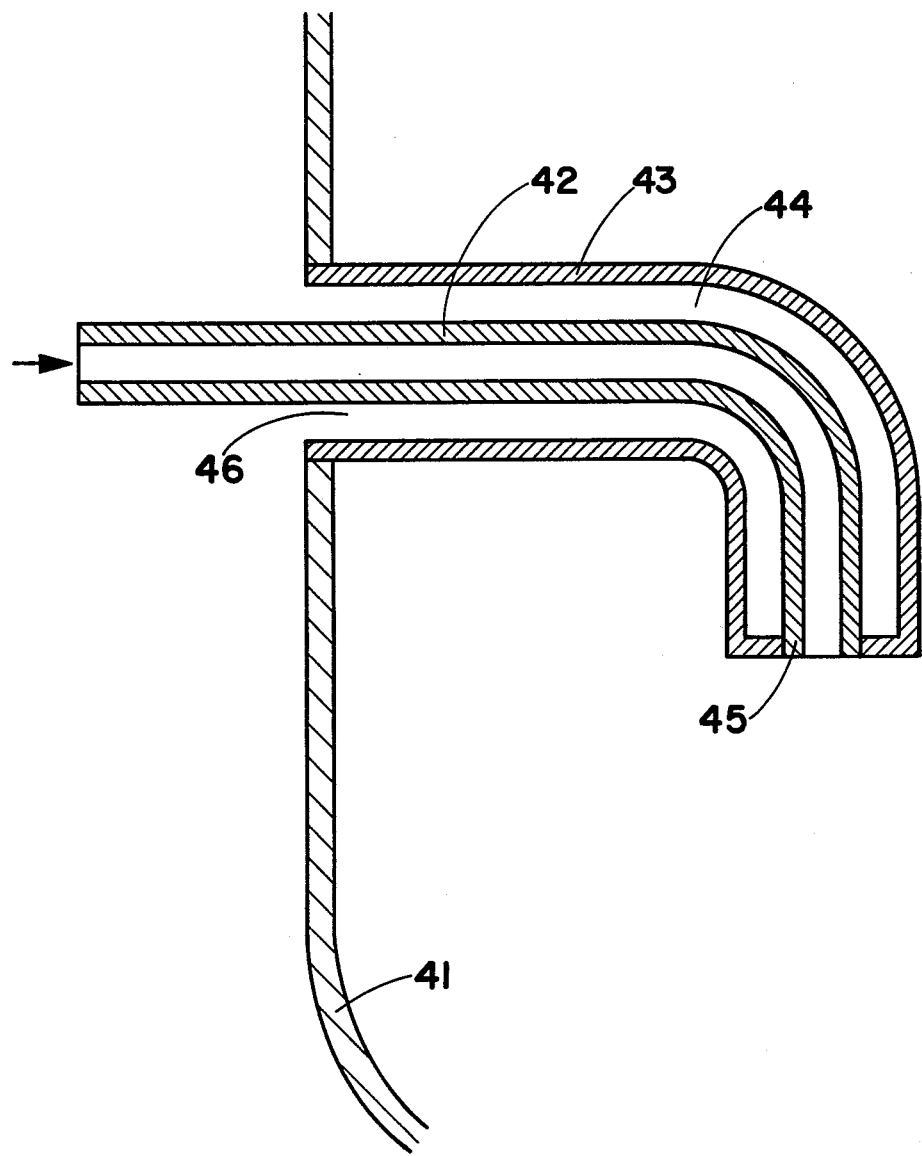

In the embodiment of FIG. 8, natural convection of air from outside the reactor 41 is used to insulate and cool the oxygen pipe 42. Annular space 44 created by second pipe 43 is closed to the reactor interior but open to free flow of air at 46 from the atmosphere outside the reactor. Thus oxygen pipe 42 is insulated from the reactor contents as far as the discharge end 45.

This invention is to be used with wet oxidation systems operated at temperatures of 300°–650° F. and pressures of 300–3500 psig pressure. It results in purge water temperatures, at the point of discharge into the reactor, of less than 250° F., and preferably less than 150° F.

For reasons of process efficiency and economy, it is desirable to operate the wet oxidation system with minimum purge water. In this invention, purge water rates may be reduced to levels between 0.01 and 10 pounds of water per pound introduced through the oxygen injection nozzle. The minimum safe purge water rate is a function of reactor operating temperature, and pressure rate of oxygen nozzle pipe.

The typical materials of construction for this invention are stainless steels, Hastelloy ® alloys, and various nickel based alloys.

EXAMPLE 1

A wet oxidation system using pure oxygen is to be operated at the following conditions:

| | |
|---|---|
| Temperature at Reactor Bottom | 600° F. |
| Reactor Pressure | 2000 psig |
| Oxygen rate, pounds per hour | 431 |
| Purge water rate, pounds per hour | 123 |
| Purge water rate, pounds per pound oxygen | 0.285 |
| Inlet temperature of oxygen and purge water | 70° F. |

Oxygen nozzle pipe ¾ inch diameter schedule 10, 24 inches long.

Assuming an overall heat transfer coefficient of 300 BTU $(Hr)^{-1}(Ft)^{-2}(°F.)^{-1}$, the discharge temperature of the oxygen-purge water stream into the reactor will be approximately 318° F. Approximately 9.5 percent of the water will be evaporated in the oxygen pipe.

Now consider the same oxygen inlet pipe with the apparatus of FIG. 1, that is, surrounded by a 1½ inch diameter schedule 10 pipe, with the annular space filled with water and mineral wool to reduce free convection of water within the annulus. The overall heat transfer coefficient will be reduced to a calculated 12.6 BTU $(Hr)^{-1}(Ft)^{-2}(°F.)^{-1}$, and the oxygen-purge water stream will discharge into the reactor at only 99.5° F. with practically no evaporation of water.

EXAMPLE 2

The wet oxidation system of Example 1 is operated under the same conditions except that the purge water rate is reduced to 0.1 pounds per pound of oxygen (i.e., 43.1 pounds per hour).

At an overall heat transfer rate of 300 BTU $(Hr)^{-1}(Ft)^{-2}(°F.)^{-1}$, the discharge temperature of the oxygen-purge water stream without this invention will be approximately 363° F., evaporating more than one-half of the purge water in the oxygen pipe.

Using the apparatus of FIG. 1, as indicated in Example 1, the discharge temperature of the oxygen-purge water stream is calculated to be 115.5° F., with only 0.4 percent of the water being evaporated.

Without the thermal insulating barrier, precipitation of salts from the potable water purge stream will produce scale in the oxygen pipe to eventually cause plugging. The problem is avoided by use of the present invention.

Furthermore, the excess evaporation in the former case will result in the oxygen pipe being filled largely with compressible gas and water vapor rather than incompressible liquid water. Any sudden fluctuations in reactor pressure will cause rapid discharge from the oxygen pipe followed by backflow of reactor liquid into the pipe. This flow reversal is largely alleviated by prevention of high evaporation rates within the oxygen pipe.

Thus, the rate of purge water in these examples can be safely reduced from 123 pounds per hour to 43.1 pounds per hour by use of this present invention.

We claim:

1. An apparatus for introducing a mixture of pure oxygen or oxygen-enriched air exceeding 25 percent oxygen and purge water into a gas-liquid reaction mixture undergoing wet oxidation at elevated temperature and pressure in a wet oxidation reactor, comprising:
    (a) a wet oxidation reactor comprised of a vertical bubble column with pressure containing walls; and
    (b) an oxygen injection nozzle comprising:
    a first pipe communicating with external sources of pressurized oxygen or oxygen-enriched air and purge water, said first pipe passing through said reactor wall and sealingly connected thereto, and projecting into the interior of said reactor; and
    a second pipe of larger diameter than said first pipe, annularly separated from said first pipe within the reactor interior to form an intermediate annular space filled with heat transfer resisting material comprised of liquid from said gas-liquid reaction mixture, wherein said intermediate annular space is connectively open to said reactor interior at the upper portion of said second pipe.

2. An oxygen injection nozzle according to claim 1, further comprising one or more barriers within said intermediate annular space to restrict free convective flow of heat transfer resisting material.

3. An oxygen injection nozzle according to claim 2, wherein said barrier comprises glass wool or mineral wool.

4. An apparatus according to claim 1, wherein said injection nozzle is mounted on and sealingly joined to the side wall of said wet oxidation reactor and includes pipe elbows in said first and second pipes, said elbow in said first pipe having its discharge end oriented in a vertical direction to direct the mixture of purge water and oxygen or oxygen-enriched air in a downward or upward direction within the reactor.

5. An apparatus according to claim 1, wherein said annular distance between said first nozzle pipe and second pipe is between 0.1 and 3 inches.

* * * * *